(No Model.)

C. E. BROWN.
WIRE JOINT.

No. 573,386. Patented Dec. 15, 1896.

Witnesses:
R. J. Jacker.
Frank A. O'Donnell

Inventor:
Clarence E. Brown
By Andrew B. Boughan,
Atty.

THE NORRIS PETERS CO., PHOTO-LITHO., WASHINGTON, D. C.

UNITED STATES PATENT OFFICE.

CLARENCE E. BROWN, OF CHICAGO, ILLINOIS.

WIRE JOINT.

SPECIFICATION forming part of Letters Patent No. 573,386, dated December 15, 1896.

Application filed October 11, 1895. Serial No. 565,374. (No model.)

*To all whom it may concern:*

Be it known that I, CLARENCE E. BROWN, a citizen of the United States, residing at Chicago, in the county of Cook and State of Illinois, have invented certain new and useful Improvements in Wire Joints; and I do hereby declare that the following is a full, clear, and exact description of the invention, which will enable others skilled in the art to which it appertains to use the same.

Heretofore joints have been made of tubes brazed or soldered together or one tube grooved or bent in various shapes with perforations for the insertion of solder; but when either of these methods are used after a short time the joint loses some of its power and becomes loose and admits air between the covering and connected wires and corrosion gradually takes place, which greatly impairs and reduces the conductivity and strength of the joint.

The object of my invention is to provide a joint for connecting wires used for conveying electrical currents that will not allow the admission of air between the covering and connected wires or that will become loose by any ordinary usage and in which a joint is necessary, so as to prevent corrosion being caused by the admission of air, and, further, to provide a joint of great conductivity and strength.

The invention consists of a double spirally-wound sheet of metal foil, each spiral being wound in an opposite direction to the other with space left in the center of each spiral for the insertion of the ends of the wires sought to be connected in opposite directions. The ends of said metal foil are then twisted in opposite directions until it becomes welded together with the wires sought to be connected and becomes a solid joint, as indicated in the drawings described herein, which are made a part of this specification.

The following is a description of the views in the accompanying drawings.

Figure 1 shows a complete longitudinal view of joint after wires are connected. Fig. 2 shows a sheet of metal foil of which joint is constructed. Fig. 3 shows enlarged side and end view of joint; also, how the metal foil is spirally wound in opposite directions. Fig. 4 shows view of joint before the insertion of wires. Fig. 5 shows a longitudinal view of joint with wires inserted and joint ready to be twisted. Fig. 6 shows a longitudinal view of section cut from the joint after being twisted. Fig. 7 shows end view of section cut from the joint after being twisted.

The following is a detailed description of the views in the accompanying drawings.

Figure 1:
Fig. 1 shows the metal foil spirally wound in opposite directions with the ends of two wires inserted at each end in the space left in the center of each spiral for their reception and the metal foil twisted until it has become connected with the wires.
Figure 2:
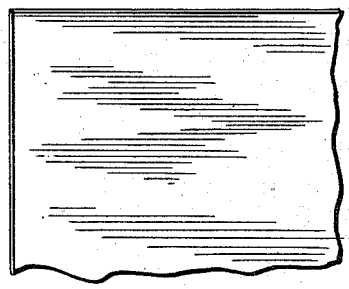
Fig. 2 shows a sheet of metal foil before it has been spirally wound for the reception of the wires.
Figure 3:
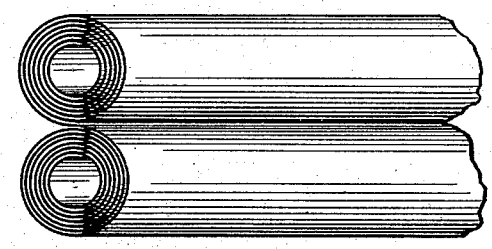
Fig. 3 shows a longitudinal and end view of a sheet of metal foil spirally wound in opposite directions with a space left in the interior of each spiral for the insertion of a wire at each end.
Figure 4:
Fig. 4 shows the joint ready for use.
Figure 5:
Fig. 5 shows the joint after the insertion of the wires and ready to be twisted.
Figure 6:
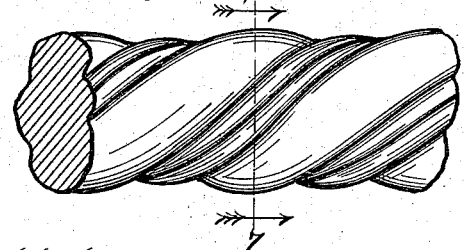
Fig. 6 shows a section cut from the joint after the wires have been inserted and the joint twisted in opposite directions, showing how the joint and wires have become connected together in one solid piece.
Figure 7:
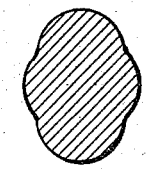
Fig. 7 shows the end of a section cut from the joint after the wires have been inserted and the joint twisted.

What I claim, and desire to secure by Letters Patent of the United States, is—

1. A joint for connecting wires to convey electrical currents consisting of a sheet of metal foil conversely spirally rolled so that when twisted with wires inserted therein it will inversely tighten spreading out at the ends exhausting the air from the connector and not bulging as a tube or tubes when twisted in a similar manner.

2. A joint for connecting wires consisting of a sheet of metal foil rolled so as to form two rolls, without the use of solder or brazing that will completely cover the wires sought to be connected at the contact-points.

3. A joint consisting of a sheet of metal foil spirally rolled from the sides in opposite directions for the purpose of forming when twisted with inserted wires a perfectly air-tight and water-tight covering for connecting wires without the use of solder or brazing.

CLARENCE E. BROWN.

Witnesses:
R. J. JACKER,
FRANK A. O'DONNELL.